9/22/87 OR 4,695,879

United States Patent [19]

Weinblatt

[11] Patent Number: 4,695,879

[45] Date of Patent: Sep. 22, 1987

[54] TELEVISION VIEWER METER

[76] Inventor: Lee S. Weinblatt, 797 Winthrop Rd., Teaneck, N.J. 07666

[21] Appl. No.: 827,760

[22] Filed: Feb. 7, 1986

[51] Int. Cl.⁴ ........................ H04H 9/00; H04N 17/00

[52] U.S. Cl. ........................................... 358/84; 455/2

[58] Field of Search ................ 358/84; 455/2; 381/25; 351/158, 209, 210; 434/184; 340/573, 825.36, 825.49

[56] References Cited

U.S. PATENT DOCUMENTS

| | | | |
|---|---|---|---|
| 3,318,517 | 5/1967 | Wells . | |
| 3,676,580 | 7/1972 | Beck . | |
| 4,095,214 | 6/1978 | Minasy . | |
| 4,399,821 | 8/1983 | Bowers . | |
| 4,546,382 | 10/1985 | McKenna et al. | 358/84 |
| 4,549,169 | 10/1985 | Moura et al. . | |
| 4,567,511 | 1/1986 | Smith et al. | 358/84 |
| 4,626,904 | 12/1986 | Lurie | 358/84 |

FOREIGN PATENT DOCUMENTS

| | | | |
|---|---|---|---|
| 2904981 | 8/1978 | Fed. Rep. of Germany | 358/84 |
| 2452135 | 11/1980 | France | 340/573 |

*Primary Examiner*—Keith E. George
*Attorney, Agent, or Firm*—Frishauf, Holtz, Goodman & Woodward

[57] ABSTRACT

A technique is provided for monitoring the viewing habits of individuals in selected households. A stationary monitoring unit is provided which cooperates with a portable monitoring unit designed to be worn on the head of the individuals in such household. The stationary monitoring unit includes a transmitter for emitting an activating signal to a receiver on the portable monitoring unit. Such receiver senses the emitted activating signal only if the individual wearing it is looking at the television set. When the activating signal is sensed, it is used to activate a transmitter which emits a signal uniquely identifying the individual wearing it. This signal is emitted to stationary monitoring unit which includes circuitry for recognizing it and storing it in a recorder for later retrieval and analysis.

8 Claims, 3 Drawing Figures

TELEVISION TUNER
VIEWER DETECTOR
TIMER
RECORDER
MODEM
5
7
10
12
14
16

TIMING SIGNAL
TRANSMITTER
RECEIVER
SIGNAL IDENTIFICATION CIRCUIT
RECEIVER
SIGNAL CONTROL UNIT
TRANSMITTER
22
24
26
24
30
32
34
36

TELEVISION VIEWER METER

BACKGROUND OF THE INVENTION

This invention is related to a technique for monitoring the television viewing habits of individual test subjects and, more particularly, to accurately determining which people in a selected household are actually watching the television set.

Information about the television viewing habits of household members is important to various organizations. For example, the television networks can determine the popularity of their shows with such information and determine their advertising rates accordingly. Also, advertisers can ascertain to what extent their commercials are being viewed.

Various techniques are available to measure the viewing habits of household members. Such information can be obtained by interviewing people at random over the telephone or in person and asking them to recall what shows they saw within a given period as, for example, during the previous evening. However, since this approach relies on a person's memory and honesty, it is inherently subjective and inaccurate. Another technique involves obtaining the cooperation of a selected number of households. Each household is given a diary into which every household member is to insert his name and the television program to which the television set is tuned along with the time. However, making a diary entry requires a deliberate action on the part of a person who may not always remember or be inclined to make the entry. Thus, the data entry approach is prone to inaccuracies. Moreover, although one or more individuals can be in a room and enter themselves into the diary, this does not necessarily mean that any of them is actually viewing the program. Accordingly, any analysis based on the presumption that entries in the diary reflect actual program viewing is prone to error.

A variation on the diary-keeping approach is an electronic system with a keypad used to enter the information electronically which is otherwise written into the diary. However, this system also suffers from the above-mentioned disadvantages related to taking the trouble to make the entry and the possibility that people entered in the system and sitting in the room are not actually viewing the program.

Another technique currently in use is utilized in accumulating the widely known Nielsen ratings. The Nielsen approach includes a unit which is typically mounted atop the television set. The Nielsen viewing-habits-monitor is depicted by unit 10 shown schematically in FIG. 1. Unit 10 is connected to a conventional TV tuner 5. Unit 10 also includes a timer 12 connected to a recorder 14. With the arrangement of tuner 12, timer 5 and recorder 14, a record is kept of the particular channel to which the television set is tuned at any given time. Timer 12 stores the signal indicative of the channel to which the tuner is set at periodic intervals of, say, one minute on recorder 14. Recorder 14 includes a storage medium capable of retaining information corresponding to approximately one week of viewing. Modem 16 is accessible from a remote central monitoring station over conventional telephone lines. Periodically, as for example once weekly, the modem in a particular household is automatically dialed up and the information stored on recorder 14 is retrieved and transmitted over the phone lines to the central monitoring station. When retrieval is completed, a signal is sent to recorder 14 which erases it and readies it for re-use during the coming week. Although this technique is in wide use, its major failing lies in its inability to ascertain whether the individuals in the room are actually viewing the television set. In fact, it may even be the case that the television set is turned on and the channel to which it is tuned is being recorded while, in fact, no one is in the room. Therefore, it is readily seen that all of the techniques currently in use provide information which cannot be relied upon in analyzing the television viewing habits of individual household members.

SUMMARY OF THE INVENTION

It is the primary object of the present invention to provide a technique for monitoring the television viewing habits of individuals with improved accuracy and reliability.

Another object of the present invention is to provide a technique for monitoring the television viewing habits of individuals which detects whether a person is actually viewing the television set at the exact time of the program and/or commerical presentation.

A further object of the present invention is to provide a technique for measuring the viewing habits of individuals with equipment that is readily adaptable to that conventionally in present use.

Yet another object of the present invention is to provide apparatus for determining the television viewing habits of individuals with equipment that is relatively low cost, reliable, and compact.

Still another object of the present invention is to provide equipment which minimizes interference with program enjoyment.

One other object of the present invention is to provide equipment which requires no deliberate action on the part of the viewer to record the viewing habits.

These and other objects of the present invention are attained by apparatus for determining the television viewing habits of at least one selected individual, which apparatus is usable with recording means coupled to a tuner of a television set for storing a television channel to which said tuner is tuned, said apparatus comprising a stationary monitoring unit adapted to be placed in close proximity to said television set, said unit including first transmitter means for regulatly emitting an activation signal, a first receiver means, and a signal identification means coupled to the output of said first receiver means; and a portable monitoring unit adapted to be worn by said selected individual and including a second receiver coupled to a signal control means, said second receiver means being responsive to said activation signal only when the individual wearing it is looking in the direction of the television set, said signal control means being responsive only to said activation signal to generate a control signal, and a second transmitter means responsive to said control signal for emitting an identification signal unique to the selected individual wearing said portable monitoring unit; and said signal identification means of the stationary monitoring unit recognizes each identification signal and generates a viewer signal to be stored on said recording means in association with the corresponding recorded television channel.

Another aspect of the invention is directed to a method for determining the television viewing habits of at least one selected individual, comprising the steps of emitting an activation signal from the vicinity of a television set; receiving said activation signal only when a selected individual is looking in the direction of said television set and distinguishing said activation signal from other signals to generate a control signal; responding to said control signal to emit an identification signal unique to said selected individual; receiving said identification signal and recognizing it to provide a viewer signal; and recording said viewer signal in association with the channel to which said television set is tuned.

DETAILED DESCRIPTION OF THE PREFERRED EMBODIMENT

Figures 1, 2:
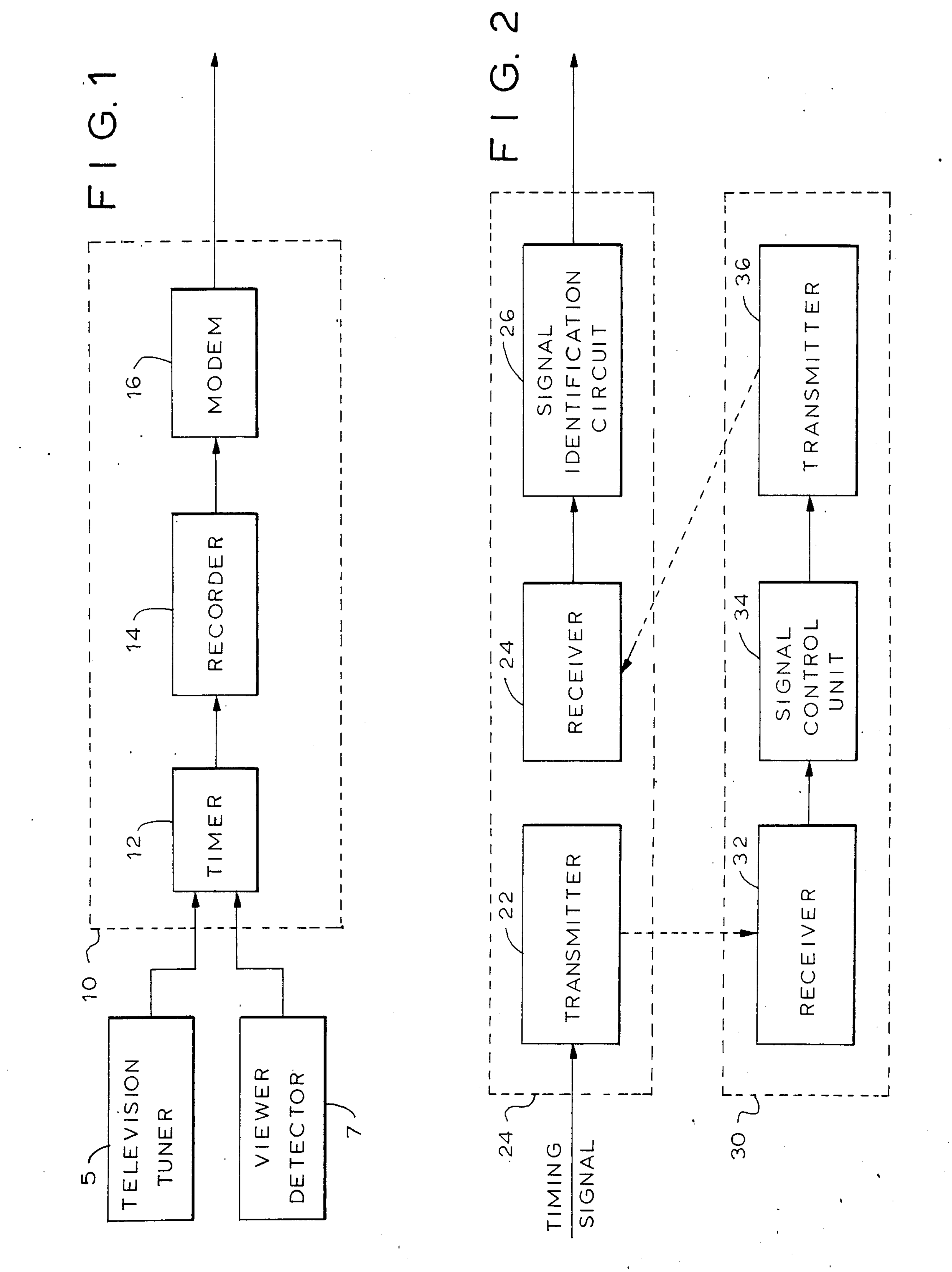
FIG. 1 is a schematic circuit block diagram of the invention.
FIG. 2 is a schematic circuit block diagram of the viewer detector which is depicted in FIG. 1.

As stated above, FIG. 1 depicts a well known viewing habit monitor 10 such as provided, for example, by Nielsen Research of Chicago, Illinois. It is coupled to television tuner 5 and utilizes a signal therefrom to store on recorder 14 the particular channel to which the television set is tuned at time intervals controlled by timer 12. Also connected to monitor 10 is a viewer detector 7 constructed in according with the principles of the present invention. Viewer detector 7 is shown in greater detail in FIG. 2. In use, the viewer detector can be coupled to the Nielsen equipment and installed simply by putting one on top of the other with both, thus, resting on the television set.

Figure 3:
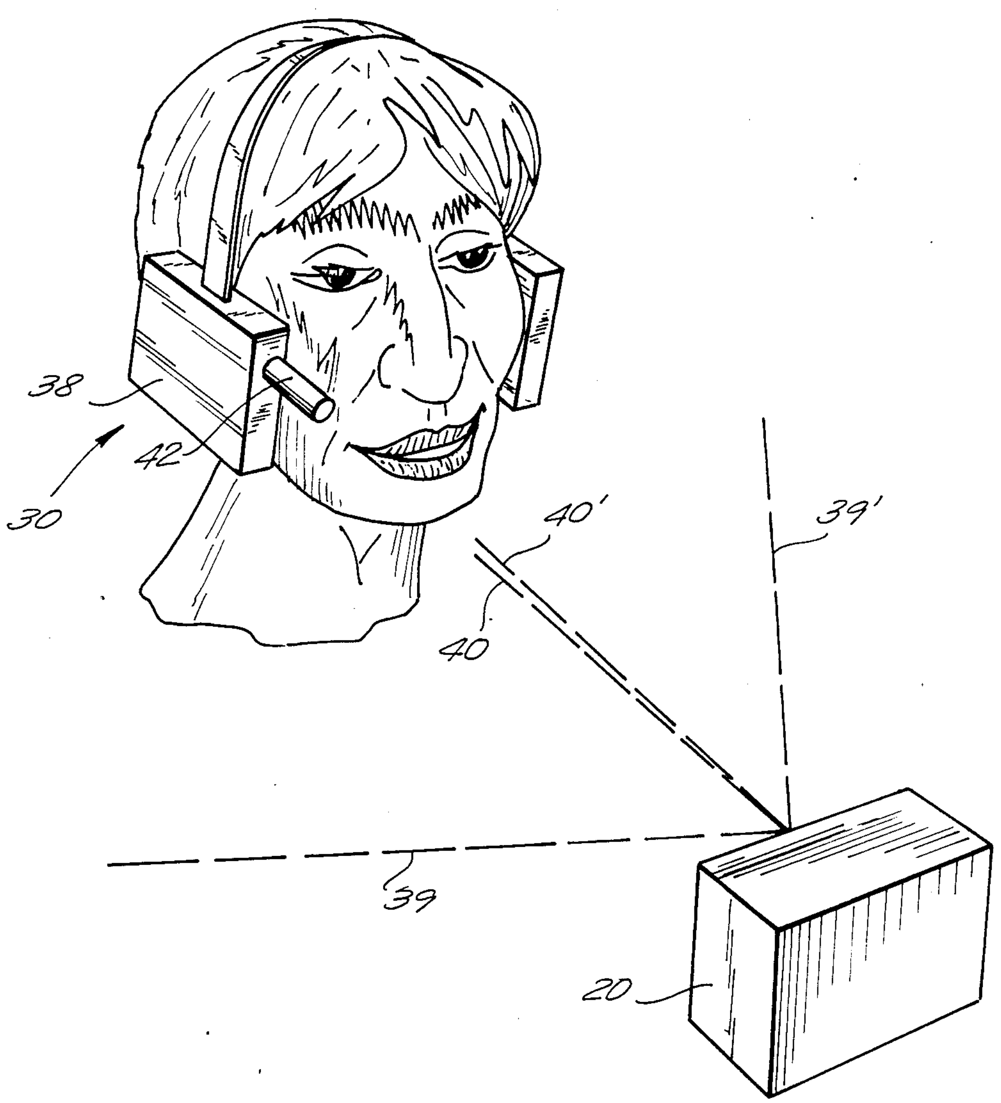
FIG. 3, is a sketch in perspective depicting the narrow range of directional sensitivity of the portable, head-worn, monitor.

Turning now to FIG. 2, viewer detector 7 includes a stationary monitoring unit 20 and a portable monitoring unit 30. These are provided to a cooperating household by the agency conducting the measurement, or survey, of television viewing habits. The household is initially contacted and informed as to the purpose of the test equipment, and its details are explained. In particular, stationary monitoring unit 20 is to be placed in close proximity to the television set. Normally, it is placed on top. The portable monitoring unit is a small and light device which must be worn on the head of each person in the household likely to watch television. The portable unit can be clipped on to an eyeglass frame or attached to a set of earphones 38, as shown in FIG. 3. Such earphones can be of the conventional variety commonly in use with portable audio recorders. Alternatively, the earphones can be ones specially constructed to carry this type of device. Such an earphone could also be a currently available type with infrared sensors to receive stereo audio signals from a remote audio transmitter. For example, a stereo adapter unit is available from Sony as Model No. MLV 1100. A transmitter for the headphones is connected to the stereo adapter and emits a signal to the earphones of interest to this invention. A set including transmitter and earphones is available from NADY Systems of Oakland, Calif. as Model No. IRH 210. The availability of high fidelity audio through these earphones is an incentive to each household member to wear them. The portable monitoring unit when worn either on an eyeglass frame or a set of earphones must be oriented so that it is aimed at the television set only when its wearer is looking at the television set for reasons explained in detail below.

Stationary monitoring unit 20 includes a transmitter 22 which emits a signal at intervals under control of a timing signal provided to it over line 23. Preferrably, transmitter 22 emits infrared ("IR" hereafter) signals. The directional spread of these signals is depicted by lines 39 and 39' in FIG. 3. In addition, the IR signals emitted by transmitter 22 are preferably digital in nature. Unit 20 also includes an IR receiver 24 and a signal identification circuit 26. The function of these circuits is explained below.

Portable monitoring unit 30 includes an IR receiver 32 which detects the signals emitted by transmitter 22. However, receiver 32 is so constructed as to be directionally sensitive only to signals emitted by a source at which it is aimed. This can be accomplished, for example, by attaching a tube 42 in front of the IR detector long enough, based on the characteristics of the detector, to obtain the desired directionality. Thus, if receiver 32 is pointed in a given direction, only those signals within a range of a slight degree of deviation from that direction, as depicted by lines 40 and 40' in FIG. 3, will be detected by it. Therefore, it is essential that receiver 32 be mounted on portable monitoring unit 30 so that when this unit is worn by its assigned individual it will be directed at transmitter 22 only when the head of the individual wearing it is pointed at the television set. In this way, receiver 32 will detect a signal emitted by transmitter 22 only when the individual wearing it is looking at, and presumably watching, the television set and the program displayed thereon.

When a signal is detected by receiver 32, it is input to signal control unit 34. Signal control unit 34 serves to distinguish the signal emitted by transmitter 22 from all other IR signals which might exist in the vicinity. Such signals might, for example, be generated by a remote control unit for the television set or by IR-carried audio signals from audio equipment and/or video recording equipment in the room or the vicinity. The digital signal from transmitter 22 is interpreted by suitable digital logic circuitry in signal control unit 34 so that the latter responds only when receiver 32 passes along to it the signal from transmitter 22. Once such a signal is recognized by signal control unit 34, it generates a control signal to transmitter 36. Transmitter 36 is preset for each individual. The signal it emits is unique to the particular individual who wears it. Thus, it is important for the various individuals in the household to wear only the portable monitoring unit which has been assigned specifically to them. Interchanging the portable monitoring units would result in a possible misinterpretation of the resultantly recorded data.

Upon receipt of the control signal from the unit 34, transmitter 36 emits its unique signal to receiver 24 in the stationary monitoring unit 20. Receiver 24 inputs this signal to signal identification circuit 26. This circuit functions to identify and separate the signals emitted from transmitter 36 for each individual. In other words, individual No. 1 may view the television at certain times of the day and the circuit 26 identifies that particular individual and transmits a signal indicative of that individual for storage by recorder 14. Likewise, circuit 26 will generate for recorder 14 a different viewer signal for individual No. 2, and so on.

In operation, a portable monitoring unit 30 is given to each individual member of the household into which stationary monitoring unit 20 has been installed. Transmitter 36 of unit 30 is preset so that it emits a signal unique for the particular individual to which it has been assigned for wearing. Stationary monitoring unit 20 is placed atop the television set and its transmitter 22 emits an IR signal at preset time intervals under control of timing signal 23. The emitted signal is detected by receiver 32 only when it is aimed at the transmitter. In other words, receiver 32 detects the transmitter signal only when the individual wearing it has his head aimed in the direction of the television set. Receiver 32 inputs the signal from transmitter 22 to signal control unit 34 which is designed to respond only to such signal. When unit 34 detects this signal, it actuates transmitter 36 to emit its unique viewer identification signal to receiver 24 in stationary monitoring unit 20. Receiver 24, in turn, inputs its signal to signal identification circuit 26 which recognizes all the identification signals from transmitters 36 assigned to that particular household. It separates them so that the viewing habits of each individual member of the household are stored on recorder 14. Recorder 14 has adequate storage capacity for the expected amount of information input to it over the period of one week. At the end of such period, a central monitoring station (not shown) remotely located from the household actuates modem 16 to transfer all the information from recorder 14 to the central monitoring station and also to erase recorder 14 after transfer of the information is completed.

Although the preferred embodiment of the invention has been described in detail above, it should be apparent that various modifications to it can readily be made. For example, although the use of infrared signals has been discussed above, other types of signals can also be used. In addition, analog signals rather than digital signals can be implemented. In such a case, the units which recognize this signal, such as signal control unit 34 and signal identification unit 26 would also be analog types of circuitry, like suitably configured filters. Furthermore, and particularly if an analog approach is utilized, the activation signal emitted by transmitter 22 need not be emitted periodically; it could just as well be emitted continuously. In addition, transmitter 36 could be set to emit one identification signal for the household without distinguishing among its members. Thus, each household would have one rather than several such signals for its remote monitoring units. These and other such modifications are intended to be included within the scope of the invention as defined in the following claims.

I claim:

1. Apparatus for determining the television viewing habits of at least one selected individual, which apparatus is usable with recording means coupled to a tuner of a television set for storing a television channel to which said tuner is tuned, said apparatus comprising:

a stationary monitoring unit adapted to be placed in close proximity to said television set, said unit including first transmitter means for regularly emitting an activation signal, a first receiver means, and a signal identification means coupled to the output of said first receiver means; and a portable monitoring unit adapted to be worn on the heat of said by least one selected individual and including a second receiver coupled to a signal control means, said second receiver means being responsive to said activation signal only when the individual wearing it is looking in the direction of the television set and including means aimed to point in substantially the same direction in which said head is pointed, said signal control means being responsive only to said activation signal to generate a control signal, and a second transmitter means responsive to said control signal for emitting an identification signal unique to the at least one selected individual wearing said portable monitoring unit; and said signal identification means of the stationary monitoring unit recognizes said identification signal and generates a viewer signal to be stored on said recording means in association with the corresponding recorded television channel.

2. The apparatus of claim 1, wherein said first transmitter and said second receiver emit and receive, respectively, infrared signals.

3. The apparatus of claim 2, wherein said second transmitter and first receiver emit and receive, respectively, infrared signals.

4. The apparatus of claim 1, wherein said recording means records identification signals associated with the corresponding time and television channel.

5. The apparatus of claim 1, wherein said first transmitter unit emits the activation signal at preselected intervals.

6. A method for determining the television viewing habits of at least one selected individual, comprising the steps of:

emiting an activation signal from the vicinity of a television set:

receiving said activation signal only when said at least one selected individual is looking in the direction of said television set and distinguishing said activation signal from other signals to generate a control signal;

responding to said control signal to emit an identification signal unique to said selected individual;

receiving said identification signal and recognizing it to provide a viewer signal;

recording said viewer signal in association with the channel to which said television set in tuned; and wherein the step of receiving the activation signal comprises narrowing the directional range of response to said emitted activation signal by a receiver to only that which occurs when said at least one selected individual is looking substantially in the direction of said television set.

7. The method of claim 6, further comprising recording the time associated with viewing said recorded television channel.

8. The method of claim 7, wherein the step of receiving the activation signal comprises placing the receiver on the head of said at least one selected individual.

* * * * *